(12) United States Patent
Wu et al.

(10) Patent No.: US 8,041,364 B2
(45) Date of Patent: Oct. 18, 2011

(54) SYSTEMS AND METHODS FOR TRANSMITTING CONTROL INFORMATION VIA A CONTROL SIGNALING CHANNEL

(75) Inventors: Huaming Wu, Vancouver, WA (US); John M. Kowalski, Camas, WA (US); Kimihiko Imamura, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1022 days.

(21) Appl. No.: 11/929,527

(22) Filed: Oct. 30, 2007

(65) Prior Publication Data

US 2009/0111480 A1   Apr. 30, 2009

(51) Int. Cl.
*H04Q 7/20* (2006.01)
(52) U.S. Cl. .............. 455/452.2; 455/550.1; 455/561
(58) Field of Classification Search ............ 455/452.2, 455/550.1, 414.1, 561
See application file for complete search history.

(56) References Cited

U.S. PATENT DOCUMENTS

| 7,522,072 B1* | 4/2009 | Wu .............................. 341/50 |
| 7,738,418 B2* | 6/2010 | Kwon et al. .................. 370/328 |
| 2009/0046805 A1* | 2/2009 | Kim et al. ................... 375/295 |
| 2010/0027450 A1* | 2/2010 | Montojo et al. ............. 370/311 |
| 2010/0238984 A1* | 9/2010 | Sayana et al. ............... 375/219 |

FOREIGN PATENT DOCUMENTS

WO    2005020519    3/2005

OTHER PUBLICATIONS

Texas Instruments, "Separate Rank and CQI Feedback in PUCCH," R1-074138, Oct. 2007.
Qualcomm Europe, "Joint Coding of CQI and ACK," R1-073920, Oct. 2007.
NTT DoCoMo, "LS on target quality on L1/L2 control channel," R1-071839, Mar. 2007.
MCC Support, "Draft Report of 3GPP TSG RAN WG1 #50 v0.2.0," R1-073896, Oct. 2007.
Sharp, "Improved Flexibility/Performance CQI+ACK/NACK Coding in the E-UTRA Uplink," R1-073321, Aug. 2007.

* cited by examiner

*Primary Examiner* — Cong Tran
(74) *Attorney, Agent, or Firm* — Austin Rapp & Hardman

(57) ABSTRACT

A method for transmitting control information may include providing formatting rules that define a format for transmission of the control information to a base station via a control signaling channel. The control information may include a channel quality indicator (CQI), an acknowledgement/non-acknowledgement (ACK/NACK), a pre-coding matrix indicator (PMI), and rank information. The method may also include providing combination rules as part of the formatting rules. The combination rules may define how the CQI, the ACK/NACK, the PMI, and the rank information are combined for transmission on the control signaling channel. The method may also include transmitting the control information to the base station via the control signaling channel in accordance with the defined formatting rules.

20 Claims, 10 Drawing Sheets

SYSTEMS AND METHODS FOR TRANSMITTING CONTROL INFORMATION VIA A CONTROL SIGNALING CHANNEL

TECHNICAL FIELD

The present disclosure relates generally to wireless communication systems. More specifically, the present disclosure relates to systems and methods for transmitting control information via a control signaling channel.

BACKGROUND

Wireless communication devices have become smaller and more powerful in order to meet consumer needs and to improve portability and convenience. Consumers have become dependent upon wireless communication devices such as cellular telephones, personal digital assistants (PDAs), laptop computers, and the like. Consumers have come to expect reliable service, expanded areas of coverage, and increased functionality.

In the context of a wireless communication system, the term "user equipment" (UE) refers to any device that may be used by an end user to communicate. UEs may be stationary or mobile, and may alternatively be referred to as mobile stations, stations, user terminals, access terminals, terminals, subscriber units, etc. Some examples of UEs include cellular phones, wireless devices, personal digital assistants (PDAs), handheld devices, wireless modems, laptop computers, etc.

Each UE may communicate with one or more base stations (which may alternatively be referred to as access points, Node Bs, etc.) via transmissions on the uplink and the downlink. The uplink (or reverse link) refers to the communication link from the UEs to the base stations, and the downlink (or forward link) refers to the communication link from the base stations to the UEs.

Typically, there are multiple types of control information transmitted from a UE to a base station in the uplink of a wireless communication system. For example, the control information may include a channel quality indicator (CQI) and an acknowledgement/non-acknowledgement (ACK/NACK). In the case of a multiple antenna communication system, the control information may also include a pre-coding matrix indicator (PMI) and rank information. The examples of control information that were just mentioned (CQI, ACK/NACK, PMI, and rank information) may be considered to be a feedback report with respect to the downlink transmission. The control information may be transmitted via a control signaling channel.

As indicated above, the present disclosure relates generally to wireless communication systems. More specifically, the present disclosure relates to systems and methods for transmitting control information via a control signaling channel.

DETAILED DESCRIPTION

Figure 1:
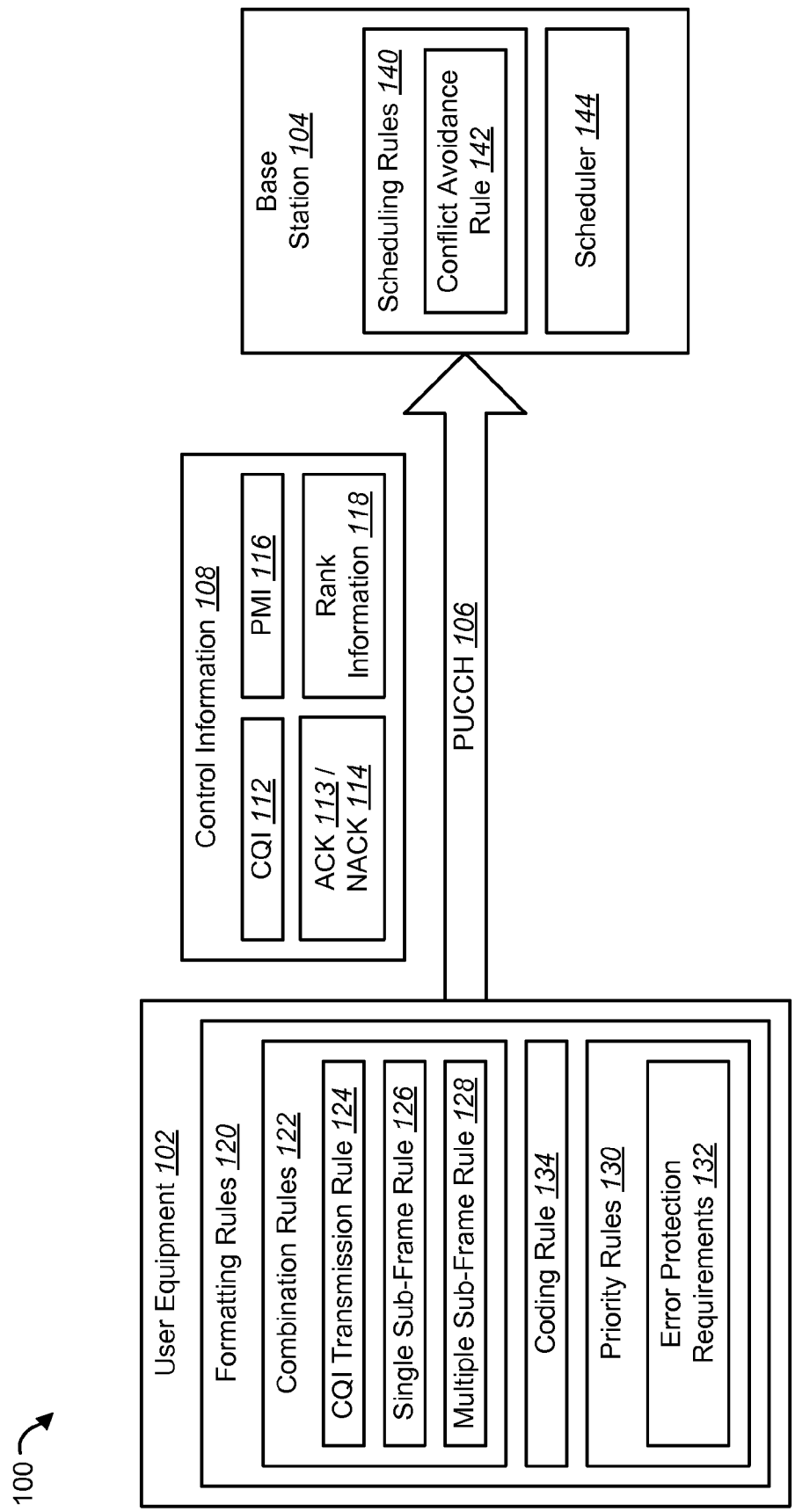
FIG. 1 illustrates an example of a wireless communication system in which control information may be transmitted from a UE to a base station via a control signaling channel.

A method for transmitting control information is disclosed. The method may include providing formatting rules that define a format for transmission of the control information to a base station via a control signaling channel. The control information may include a channel quality indicator (CQI), an acknowledgement/non-acknowledgement (ACK/NACK), a pre-coding matrix indicator (PMI), and rank information. The method may also include providing combination rules as part of the formatting rules. The combination rules may define how the CQI, the ACK/NACK, the PMI, and the rank information are combined for transmission on the control signaling channel. The method may also include transmitting the control information to the base station via the control signaling channel in accordance with the defined formatting rules.

The method may also include providing a coding rule as part of the formatting rules. The coding rule may specify that a coding scheme is used when multiple types of control information are transmitted together. The method may also include providing an embedded coding scheme to be used when multiple types of control information are transmitted together.

The method may also include providing priority rules as part of the formatting rules. The priority rules may define how the CQI, the ACK/NACK, the PMI, and the rank information are prioritized for purposes of a coding scheme that is used when multiple types of control information are transmitted together. The priority rules may be based on error protection requirements of the multiple types of control information. The error protection requirements may be defined as ACK/NACK=rank information>PMI=CQI.

The combination rules may include a channel quality indicator (CQI) transmission rule. The CQI transmission rule may specify that when the CQI would otherwise be transmitted alone, the CQI is transmitted with the NACK. The combination rules may include reserving 2 bits for ACK/NACK or rank information.

The combination rules may include a single sub-frame rule. The single sub-frame rule may specify that if the size of the control information to transmit does not exceed a defined maximum value, the control information is transmitted in a single sub-frame.

The combination rules may also include a multiple sub-frame rule. The multiple sub-frame rule may specify that if the size of the control information to transmit exceeds a defined maximum value, the CQI and the ACK/NAK are transmitted in a first sub-frame, and the PMI and the rank information are transmitted in a second sub-frame.

The combination rules may also include a rule for the base station to schedule the downlink data such that there will be no ACK/NACK triggered when the rank information is scheduled in one sub-frame.

A wireless device that is configured for transmitting control information is also disclosed. The wireless device includes a processor, and memory in electronic communication with the processor. Formatting rules may be stored in the memory. The formatting rules may define a format for transmission of the control information to a base station via a control signaling channel. The control information may include a channel quality indicator (CQI), an acknowledgement/non-acknowledgement (ACK/NACK), a pre-coding matrix indicator (PMI), and rank information. Combination rules may be included among the formatting rules. The combination rules may define how the CQI, the ACK/NACK, the PMI, and the rank information are combined for transmission on the control signaling channel. In addition, instructions may be stored in the memory. The instructions may be executable to transmit the control information to the base station via the control signaling channel in accordance with the defined formatting rules.

A computer-readable medium is also disclosed. The computer-readable medium may include executable instructions for providing formatting rules that define a format for transmission of control information to a base station via a control signaling channel. The control information may include a channel quality indicator (CQI), an acknowledgement/non-acknowledgement (ACK/NACK), a pre-coding matrix indicator (PMI), and rank information. The computer-readable medium may also include executable instructions for providing combination rules as part of the formatting rules. The combination rules may define how the CQI, the ACK/NACK, the PMI, and the rank information are combined for transmission on the control signaling channel. The computer-readable medium may also include executable instructions for transmitting the control information to the base station via the control signaling channel in accordance with the defined formatting rules.

A base station is also disclosed. The base station includes a processor, and memory in electronic communication with the processor. The base station may also include scheduling rules stored in the memory. The scheduling rules may define how the base station schedules downlink data that is transmitted to user equipment. The scheduling rules may include a conflict avoidance rule. The conflict avoidance rule may specify that the base station schedules the downlink data such that there will be no acknowledgement/non-acknowledgement triggered when rank information is scheduled in one sub-frame.

FIG. 1 illustrates an example of a wireless communication system 100 in which control information 108 may be transmitted from a UE 102 to a base station 104 via a control signaling channel 106. An example of this kind of wireless communication system 100 is a system that is configured in accordance with the 3rd Generation Partnership Project (3GPP) Long Term Evolution (LTE) project. In the current working assumption of a 3GPP LTE system, the Physical Uplink Control Channel (PUCCH) is defined as the control signaling channel 106 for the uplink.

The control information 108 may include the CQI 112 and the ACK 113/NACK 114. If the base station 104 utilizes multiple transmit antennas, then the control information 108 may also include the PMI 116 and the rank information 118.

Table 1 shows different examples of the number of control information bits that may be used for different scenarios where different numbers of transmitting antennas are used.

TABLE 1

Number of rank, PMI, CQI and ACK/NACK bits.

| | | Scenarios | | | |
|---|---|---|---|---|---|
| | | 2-Tx Antennas | | 4-Tx Antennas | |
| Types | SIMO | Rank = 1 | Rank = 2 | Rank = 1 | Rank >1 |
| CQI | 5 | 5 | 8 | 5 | 8 |
| ACK/NACK | 1 | 1 | 2 | 1 | 2 |
| PMI | 0 | 3 | 2 | 4 | 4 |
| rank | 0 | 1 | 1 | 2 | 2 |

Different types of control information 108 may have different reporting rates. For instance, the required feedback rate for the rank information 118 may be much lower compared to that for the CQI 112 and the PMI 116. Hence, the rank information 118 may be transmitted less often than the CQI 112 in order to avoid the unnecessary overhead. In addition, the required quality targets (as defined by message error rate and delay) for different types of control information 108 may be different. For example, the quality targets of CQI 112 and ACK/NACK 113/114 are shown in Table 2.

TABLE 2

Uplink control signaling target quality.

| Event | Target quality |
|---|---|
| NACK to ACK error | $10^{-4}$ |
| CQI block error rate | $10^{-2} \sim 10^{-1}$ |

Similarly, it is expected that an error in decoding the rank information 118 tends to be more detrimental than an error in decoding the CQI 112. In other words, rank information 118 may be more important than the CQI 112 and the PMI 116.

At some point, the UE 102 may receive formatting rules 120 and store the formatting rules 120 in its memory. The formatting rules 120 may define a format for transmission of the control information 108 to the base station 104 via the PUCCH 106.

The formatting rules 120 may include combination rules 122. The combination rules 122 may define how the CQI 112, the ACK 113/NACK 114, the PMI 116, and the rank information 118 are combined for transmission on the PUCCH 106.

The combination rules 122 may include a CQI transmission rule 124. The CQI transmission rule 124 may specify that when a CQI 112 would otherwise be transmitted alone, the CQI 112 is transmitted with a NACK 114. Stated another way, the UE 102 may always reserve 2 bits for the ACK 113/NACK 114 or the rank information 118. If there is no downlink data, the UE 102 sends back a NACK 114. By doing this, the base station 104 is less likely to confuse the CQI 112 only with the combination of the CQI 112 and the ACK 113/NACK 114 formats (due to misdetection of a downlink grant at the UE 102).

It should be noted that the combination of the CQI 112 and the ACK 113/NACK 114 may have the highest transmission rate. The ACK 113/NACK 114 feedback rate may be different than the CQI 112 feedback rate since the ACK 113/NACK 114 is transmitted in response to downlink data.

The scheduler 144 on the base station 104 should schedule downlink data to avoid conflict between the reporting of the rank information 118 with the reporting of the ACK 113/NACK 114. It may have less impact to the scheduler performance because in some implementations the feedback period for the rank information 118 is 20 ms.

The base station 104 is shown with scheduling rules 140. The scheduling rules 140 may define how the base station 104 schedules downlink data that is transmitted to UEs 102.

The scheduling rules 140 may include a conflict avoidance rule 142. The conflict avoidance rule 142 may specify that the base station 104 schedules the downlink data such that there will be no ACK 113/NACK 114 triggered when the rank information 118 is scheduled in one sub-frame.

There may be a certain maximum number of bits (e.g., 10 bits) that may be transmitted per sub-frame via the PUCCH 106 from a single UE 102. The combination rules 122 may include a rule 126 for the case where the control information 108 to transmit does not exceed this maximum number of bits. This rule 126 may specify that if the size of the control information 108 to transmit does not exceed the defined maximum value, the control information 108 is transmitted in a single sub-frame. This rule 126 may be referred to herein as the single sub-frame rule 126. The single sub-frame rule 126 may be applicable to the single-input-multiple-output (SIMO) case.

The combination rules 122 may also include a rule 128 for the case where the control information 108 to transmit does exceed this maximum number of bits. This rule 128 may specify how the control information 108 is to be divided among multiple sub-frames if the size of the control information 108 to transmit exceeds the defined maximum value. This rule 128 may be referred to herein as the multiple sub-frame rule 128. The multiple sub-frame rule 128 may specify that if the amount of control information 108 exceeds the defined maximum value, the CQI 112 and the ACK 113/NACK 114 are transmitted in a first sub-frame, and the PMI 116 and the rank information 118 are transmitted in a second sub-frame. The multiple sub-frame rule 128 may be applicable for the multiple-input-multiple-output (MIMO) case.

The formatting rules 120 may also include a coding rule 134. The coding rule 134 may specify that an embedded coding scheme is used when multiple types of control information 108 are transmitted together.

The formatting rules 120 may also include priority rules 130. The priority rules 130 may define how the CQI 112, the ACK 113/NACK 114, the PMI 116, and the rank information 118 are prioritized for purposes of the coding scheme that is specified by the coding rule 134. The priority rules 130 may be based on error protection requirements 132 of the multiple types of control information 108 that are being transmitted. For example, the error protection requirements 132 may be defined as ACK/NACK=rank>PMI=CQI.

The report of the PMI 116 and the rank information 118 may be scheduled by the base station 104. In other words, the resource of the PUCCH 106 (time, frequency and/or sequence) for the PMI 116 and the rank information 118 may be determined by the base station 104.

As mentioned, at some point the UE 102 may receive and store the formatting rules 120. The UE 102 may thereafter transmit the control information 108 to the base station 104 via the PUCCH 106 in accordance with the defined formatting rules 120.

Figure 2:
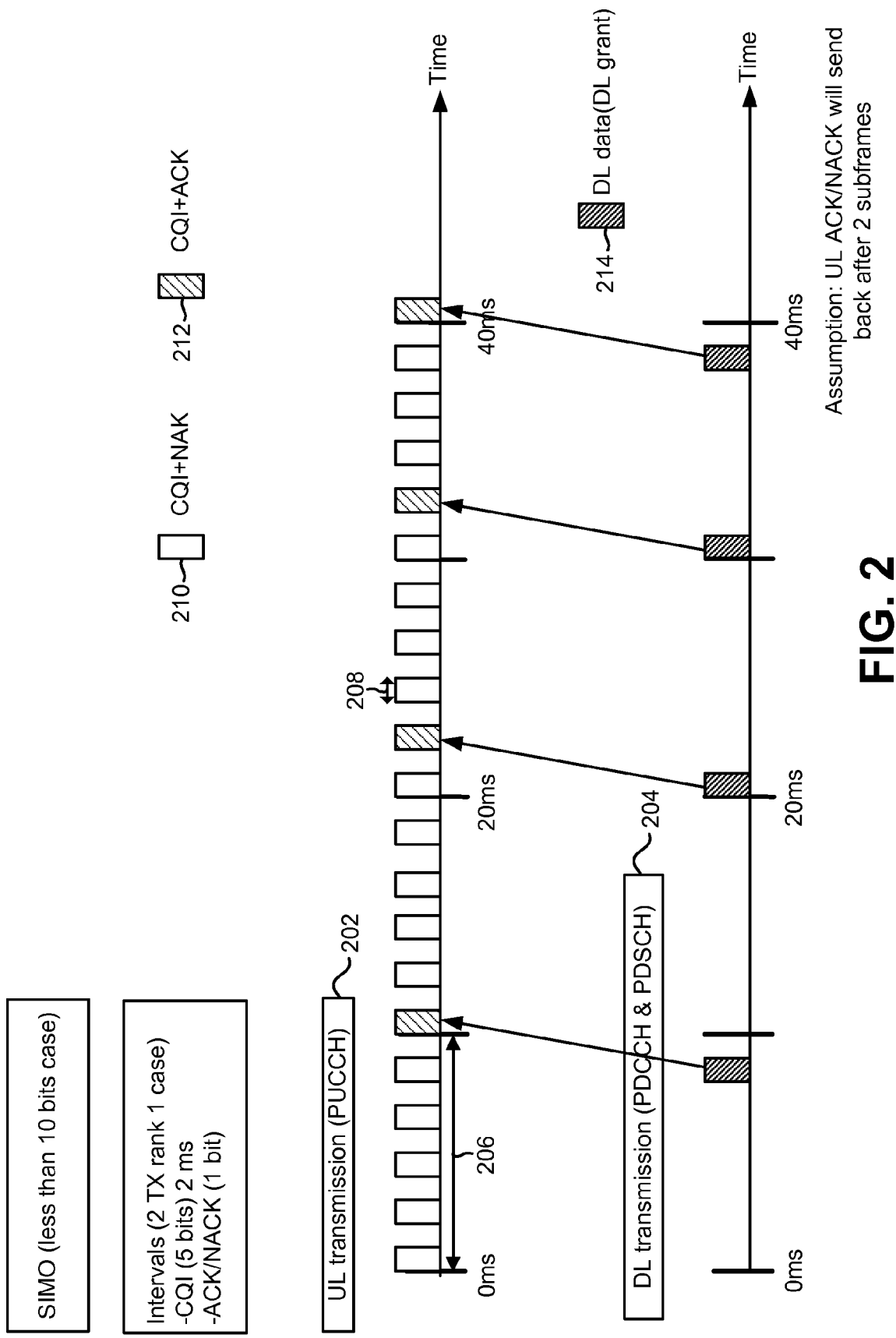
FIG. 2 illustrates an example of how a UE may transmit control information to a base station in accordance with the defined formatting rules.

FIG. 2 illustrates an example of how the UE 102 may transmit control information 108 to the base station 104 in accordance with the defined formatting rules 120. The depicted example relates to the downlink single-input-multiple-output (SIMO) case.

Both the uplink transmission 202 and the downlink transmission 204 are shown. The uplink transmission 202 and the downlink transmission 204 are both divided into frames 206. Each frame 206 is divided into ten sub-frames 208.

The downlink transmission 204 includes a downlink grant 214. The uplink transmission 202 includes combinations of the CQI 112 and the ACK 113/NACK 114.

The simultaneous transmission of the CQI 112 and the ACK 113 is shown as CQI+ACK 212. The simultaneous transmission of the CQI 112 and the NACK 114 is shown as CQI+NAK 210.

Figure 3:
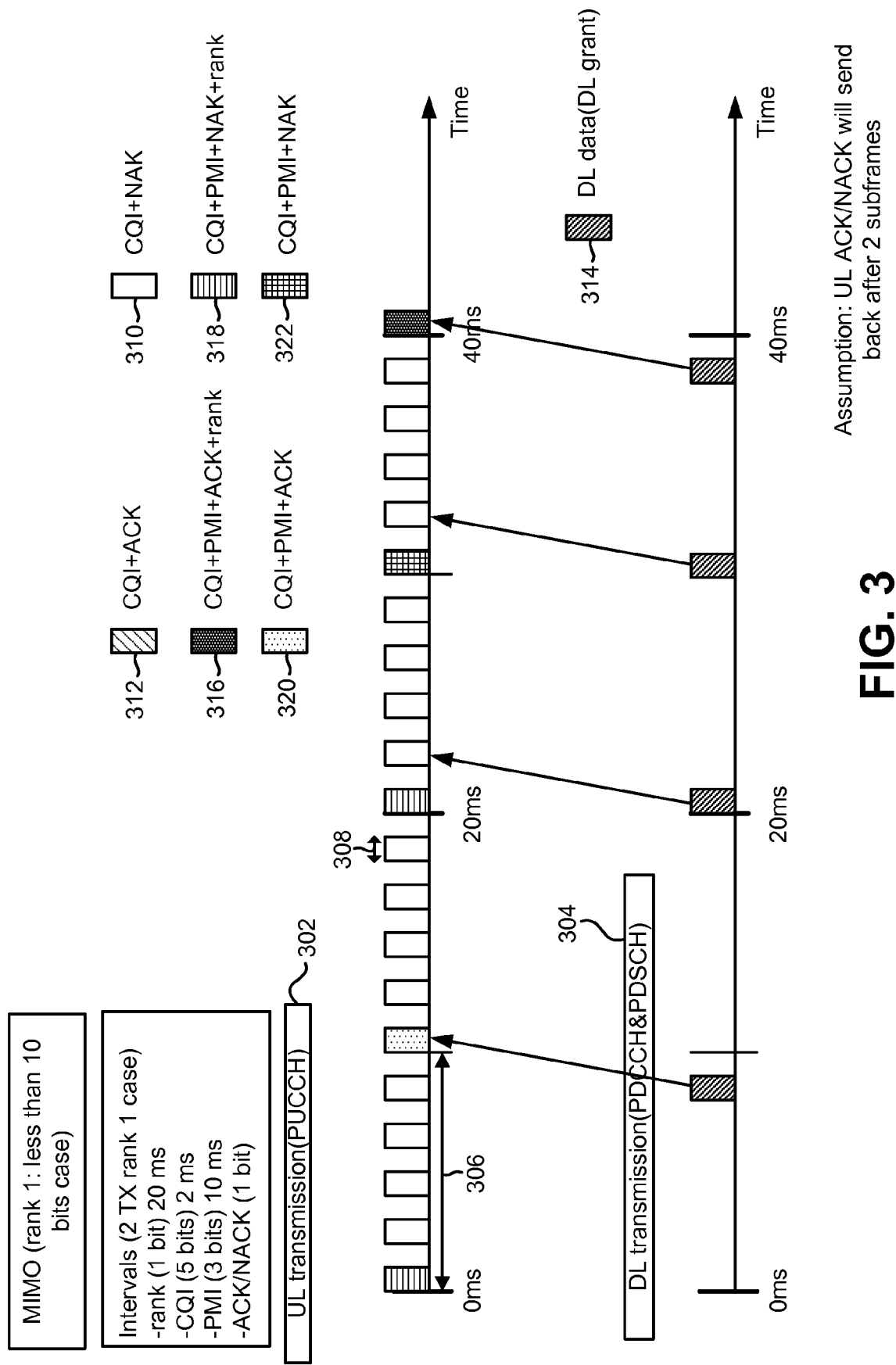
FIG. 3 illustrates another example of how a UE may transmit control information to a base station in accordance with the defined formatting rules.

FIG. 3 illustrates another example of how the UE 102 may transmit control information 108 to the base station 104 in accordance with the defined formatting rules 120. The depicted example relates to the downlink multiple-input-multiple-output (MIMO) case, where two transmit antennas are used, and the rank 118 is equal to one.

Both the uplink transmission 302 and the downlink transmission 304 are shown. The uplink transmission 302 and the downlink transmission 304 are both divided into frames 306. Each frame 306 is divided into ten sub-frames 308.

The downlink transmission 304 includes a downlink grant 314. The uplink transmission 302 includes various combinations of the CQI 112, the ACK 113/NACK 114, the PMI 116, and the rank information 118.

The simultaneous transmission of the CQI 112 and the NACK 114 is shown as CQI+NAK 310. The simultaneous transmission of the CQI 112 and the ACK 113 is shown as CQI+ACK 312.

The simultaneous transmission of the CQI 112, the PMI 116, the ACK 113, and the rank information 118 is shown as CQI+PMI+ACK+rank 316. The simultaneous transmission of the CQI 112, the PMI 116, the NACK 114, and the rank information 118 is shown as CQI+PMI+NAK+rank 318.

The simultaneous transmission of the CQI 112, the PMI 116, and the ACK 113 is shown as CQI+PMI+ACK 320. The simultaneous transmission of the CQI 112, the PMI 116, and the NACK 114 is shown as CQI+PMI+NAK 322.

Figure 4:
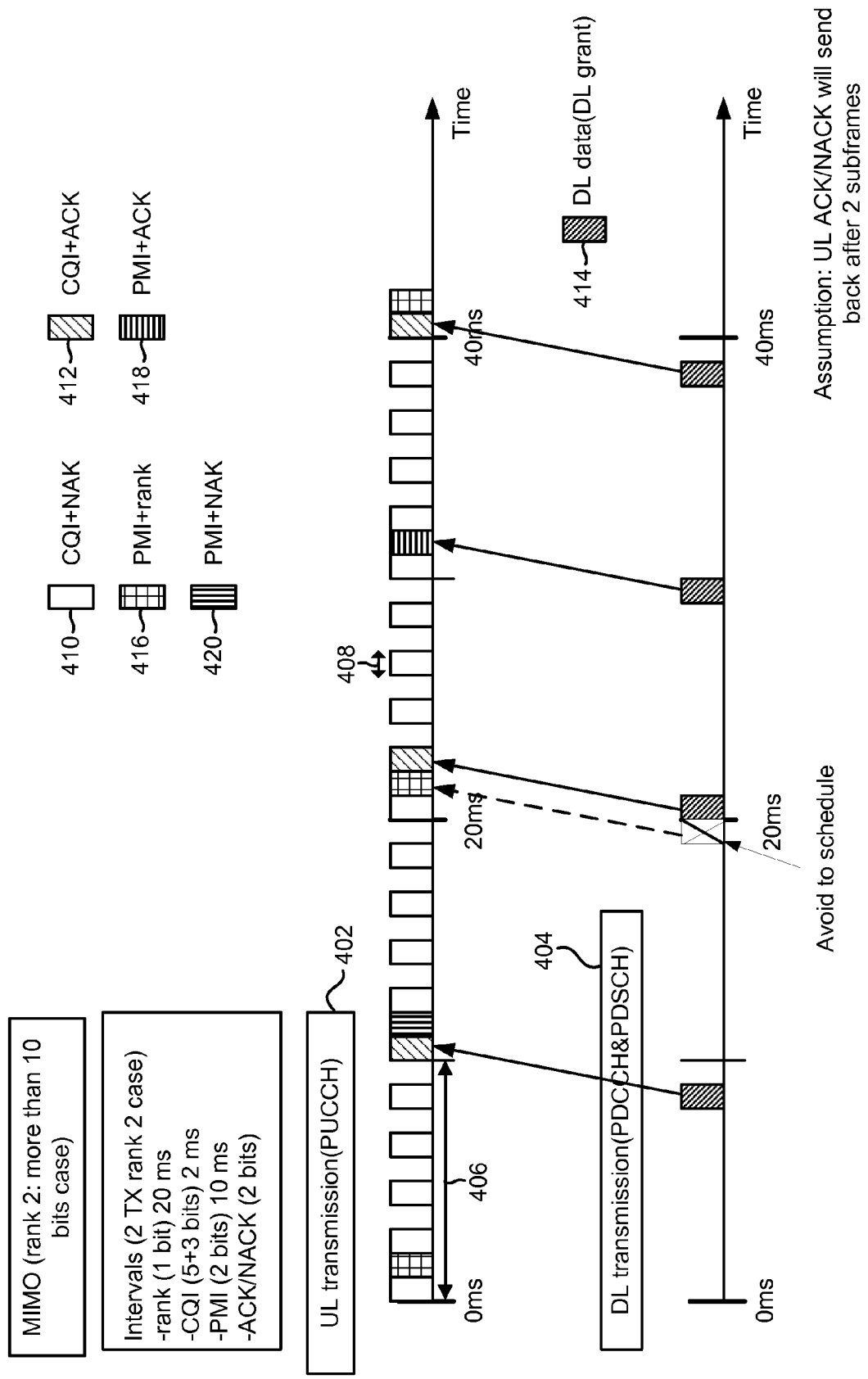
FIG. 4 illustrates another example of how a UE may transmit control information to a base station in accordance with the defined formatting rules.

FIG. 4 illustrates another example of how the UE 102 may transmit control information 108 to the base station 104 in accordance with the defined formatting rules 120. The depicted example relates to the downlink MIMO case, where two transmit antennas are used, and the rank 118 is equal to two.

Both the uplink transmission 402 and the downlink transmission 404 are shown. The uplink transmission 402 and the downlink transmission 404 are both divided into frames 406. Each frame 406 is divided into ten sub-frames 408.

The downlink transmission 404 includes a downlink grant 414. The uplink transmission 402 includes various combinations of the CQI 112, the ACK 113/NACK 114, the PMI 116, and the rank information 118.

The simultaneous transmission of the CQI 112 and the NACK 114 is shown as CQI+NAK 410. The simultaneous transmission of the CQI 112 and the ACK 113 is shown as CQI+ACK 412.

The simultaneous transmission of the PMI 116 and the rank information 118 is shown as PMI+rank 416. The simultaneous transmission of the PMI 116 and the ACK 113 is shown as PMI+ACK 418. The simultaneous transmission of the PMI 116 and the NACK 114 is shown as PMI+NAK 420.

Figure 5:
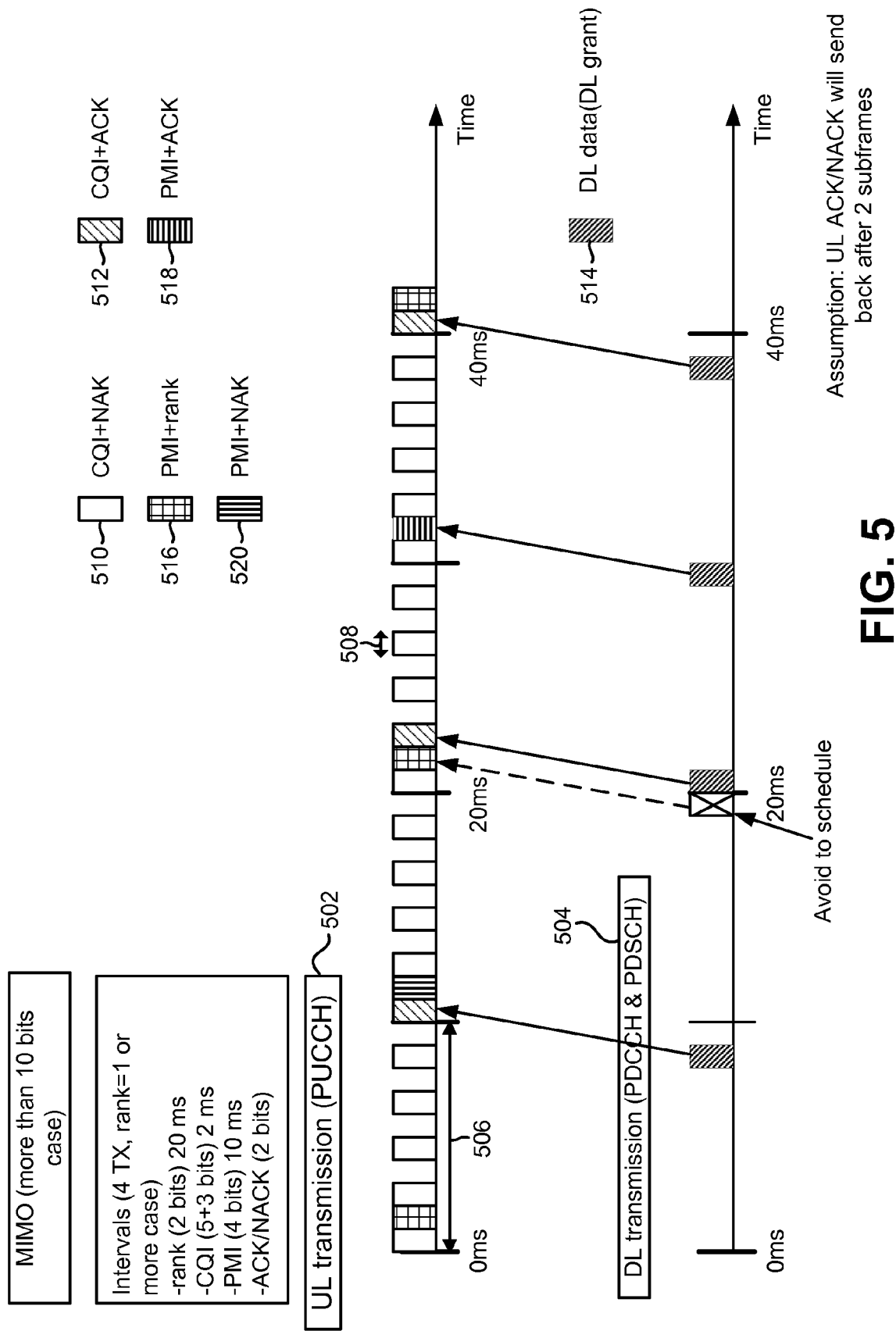
FIG. 5 illustrates another example of how a UE may transmit control information to a base station in accordance with the defined formatting rules.

FIG. 5 illustrates another example of how the UE 102 may transmit control information 108 to the base station 104 in accordance with the defined formatting rules 120. The depicted example relates to the downlink MIMO case, where four transmit antennas are used, and the rank 118 is equal to or greater than one.

Both the uplink transmission 502 and the downlink transmission 504 are shown. The uplink transmission 502 and the downlink transmission 504 are both divided into frames 506. Each frame 506 is divided into ten sub-frames 508.

The downlink transmission 504 includes a downlink grant 514. The uplink transmission 502 includes various combinations of the CQI 112, the ACK 113/NACK 114, the PMI 116, and the rank information 118.

The simultaneous transmission of the CQI 112 and the NACK 114 is shown as CQI+NAK 510. The simultaneous transmission of the CQI 112 and the ACK 113 is shown as CQI+ACK 512.

The simultaneous transmission of the PMI 116 and the rank information 118 is shown as PMI+rank 516. The simultaneous transmission of the PMI 116 and the ACK 113 is shown as PMI+ACK 518. The simultaneous transmission of the PMI 116 and the NACK 114 is shown as PMI+NAK 520.

Figure 6:
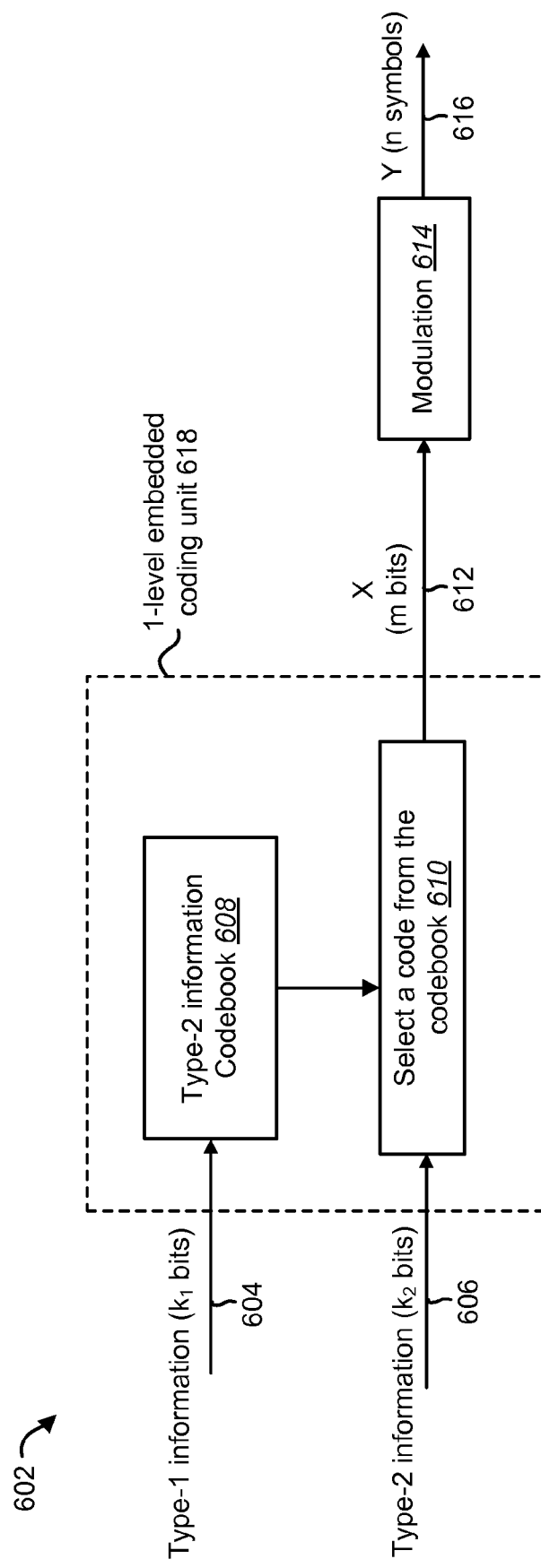
FIG. 6 illustrates an example of an embedded coding scheme that may be implemented by a UE in order to simultaneously transmit different types of control information to a base station.

FIG. 6 illustrates an example of an embedded coding scheme 602. The embedded encoding scheme 602 may be implemented by a UE 102 in order to simultaneously transmit different types of control information 108 to a base station 104.

Two different types of information 604, 606 are shown being input to an embedded coding unit 618. The first type of information 604 may be referred to as type-1 information 604. The second type of information 604 may be referred to as type-2 information 606. The type-1 information 604 has $k_1$ bits, and the type-2 information 606 has $k_2$ bits.

The type-1 information 604 may be used to create a codebook 608. The type-2 information 606 may then be encoded using a code that is selected from the codebook 608. This results in an m-bit codeword 612, which is labeled X in FIG. 6. In FIG. 6, the type-2 information 606 is shown being provided as input to a block 610 that performs the function of selecting the code from the codebook 608 and encoding the type-2 information 606 using the selected code.

The codeword 612 may then be modulated. The codeword 612 is shown being provided as input to a modulation block 614 that performs the function of modulating the codeword 612. This results in a modulated codeword 616, which is labeled Y in FIG. 6. The modulated codeword 616 has n symbols, where the value of n depends on the modulation scheme that is used.

The embedded coding scheme 602 shown in FIG. 6 may be utilized by a UE 102 in order to simultaneously transmit different types of control information 108 to a base station 104. For example, to transmit the CQI 112 and the ACK 113 simultaneously, the ACK 113 may be the type-1 information 604 shown in FIG. 6, and the CQI 112 may be the type-2 information 606 shown in FIG. 6.

Figure 7:
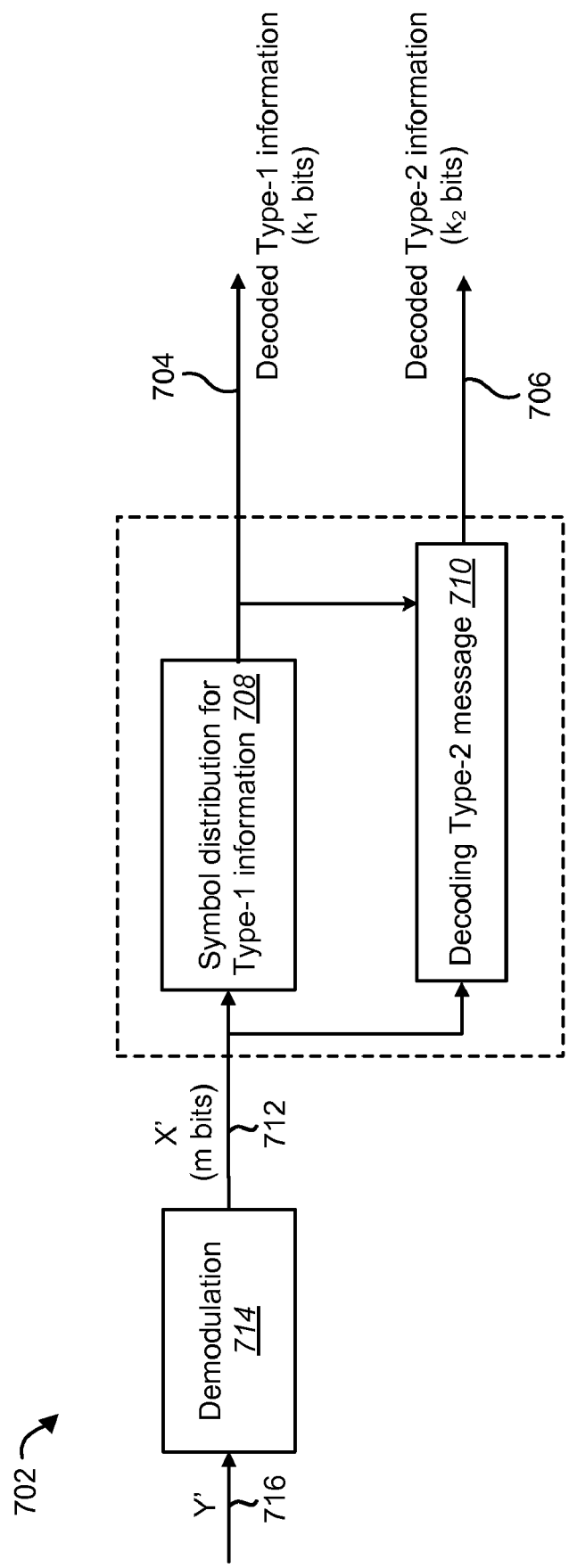
FIG. 7 illustrates an example of an embedded decoding scheme that may be implemented by a base station in order to receive control information from a UE that utilizes the embedded coding scheme of FIG. 6.

FIG. 7 illustrates an example of an embedded decoding scheme 702. The embedded decoding scheme 702 may be implemented by a base station 104 in order to receive control information 108 from a UE 102 that utilizes the embedded coding scheme of FIG. 6.

A received symbol sequence 716 (which is labeled Y') may be evaluated to determine the symbol distribution 708 contained therein. The type-1 information 704 may be determined based on the symbol distribution 708. In other words, the symbol distribution 708 (i.e., the occurrence of modulated symbols) may implicitly convey the type-1 information 704.

The received symbol sequence 716 may be demodulated by a demodulation block 714, thereby resulting in an m-bit codeword 712 (which is labeled X' in FIG. 7). This m-bit codeword 712 may be decoded using conventional methods such as maximum likelihood detection, thereby resulting in the decoded type-2 information 706.

Figure 8:
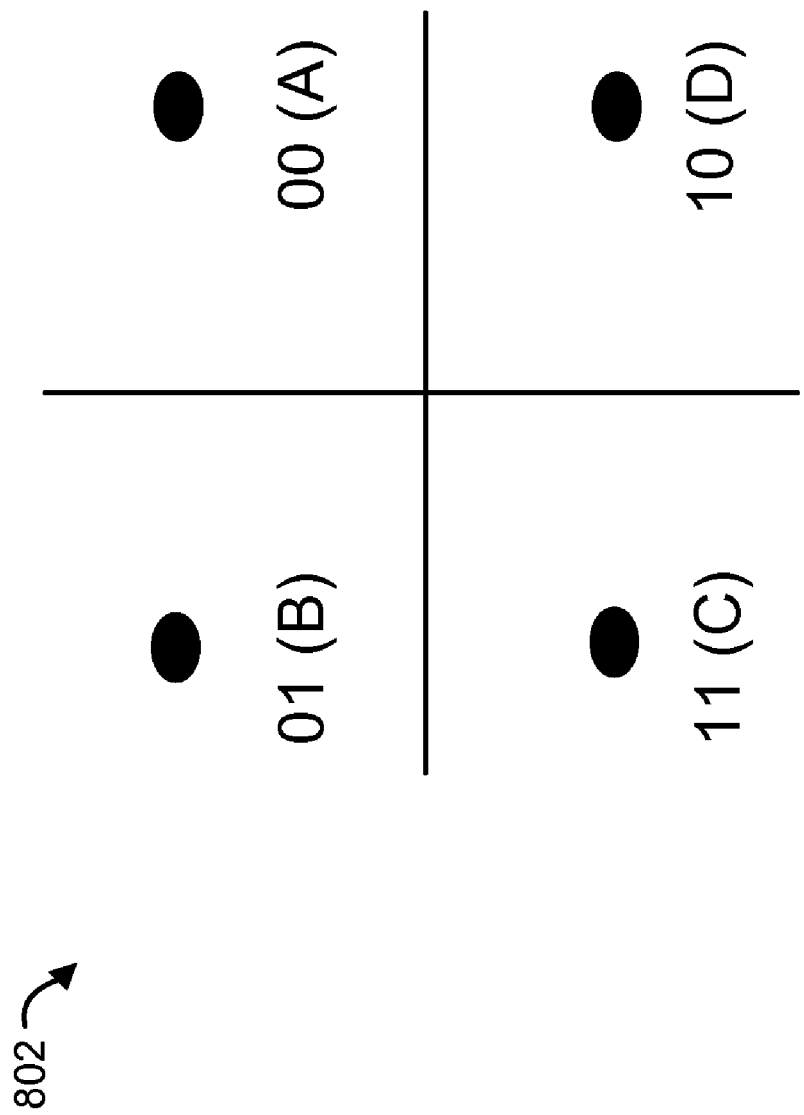
FIG. 8 illustrates an example of a quadrature phase shift keying (QPSK) constellation.

An example illustrating the embedded coding/decoding schemes of FIGS. 6-7 will now be discussed. In this example, it will be assumed that $k_1=2$, $k_2=8$ and m=20. It will also be assumed that quadrature phase shift keying (QPSK) is used as the modulation scheme. FIG. 8 illustrates an example of a QPSK constellation 802 where the four symbols are labeled as A, B, C and D respectively. Thus, n=10.

Initially, it will be assumed that the type-1 information 604 is "00". For this value of the type-1 information 604, the modulated codeword 616 of the type-2 information 606 should contain more A symbols than any other symbols. For example, the symbol distribution 708 for the modulated codeword 616 may be chosen to be 7 A symbols, 1 B symbol, 1 C symbol and 1 D symbol. Then, $2^8=256$ codes may be randomly chosen among all possible code words to be the codebook 608. Table 3 shows an example codebook 608 for the type-2 information 606 when the type-1 information 604 is "00".

TABLE 3

Example type-2 information codebook when type-1 information is "00".

| Type-2 information | X | Y |
|---|---|---|
| 00000000 | 00000000000010111111010 | AAAAAABBCCDD |
| ... | ... | ... |
| 11111111 | 10000000000010111111000 | DAAAAABBCCDA |

The type-2 codebook 608 may be generated in a similar way when the type-1 information 604 is "01", "11", or "10" by having the modulated codeword 616 contain more B, C, or D symbols, respectively. Table 4 shows examples of possible symbol distributions 708 for the modulated codeword 616 for different values of the type-1 information 604.

TABLE 4

Examples of possible symbol distributions for the modulated codeword Y for different values of type-1 information.

| Type-1 information | Y |
|---|---|
| 00 | 7A, 1B, 1C, 1D |
| 01 | 1A, 7B, 1C, 1D |
| 11 | 1A, 1B, 7C, 1D |
| 10 | 1A, 1B, 1C, 7D |

Let $N_A$, $N_B$, $N_C$ and $N_D$ denote the corresponding number of A, B, C and D symbols that occur in the received symbol sequence 716. Table 5 shows an example decoding rule for determining the type-1 information 704 where the symbol distribution 708 is one of the possible symbol distributions 708 shown in Table 4.

TABLE 5

Example decoding rule for determining the type-1 information where the symbol distribution is one of the possible symbol distributions shown in Table 4.

| Condition | Type-1 information decision |
|---|---|
| $N_A$ is the largest among $N_A$, $N_B$, $N_C$ and $N_D$ | 00 |
| $N_B$ is the largest among $N_A$, $N_B$, $N_C$ and $N_D$ | 01 |

TABLE 5-continued

Example decoding rule for determining the type-1 information where the symbol distribution is one of the possible symbol distributions shown in Table 4.

| Condition | Type-1 information decision |
|---|---|
| $N_C$ is the largest among $N_A$, $N_B$, $N_C$ and $N_D$ | 11 |
| $N_D$ is the largest among $N_A$, $N_B$, $N_C$ and $N_D$ | 10 |

In general, by embedding the type-1 information 604 into the type-2 codeword 612, higher error protection can be provided to the type-1 information 604. Furthermore, the error protection levels for the type-1 information 604 and the type-2 information 606 may be controlled by choosing different symbol distributions 708.

Figure 9:
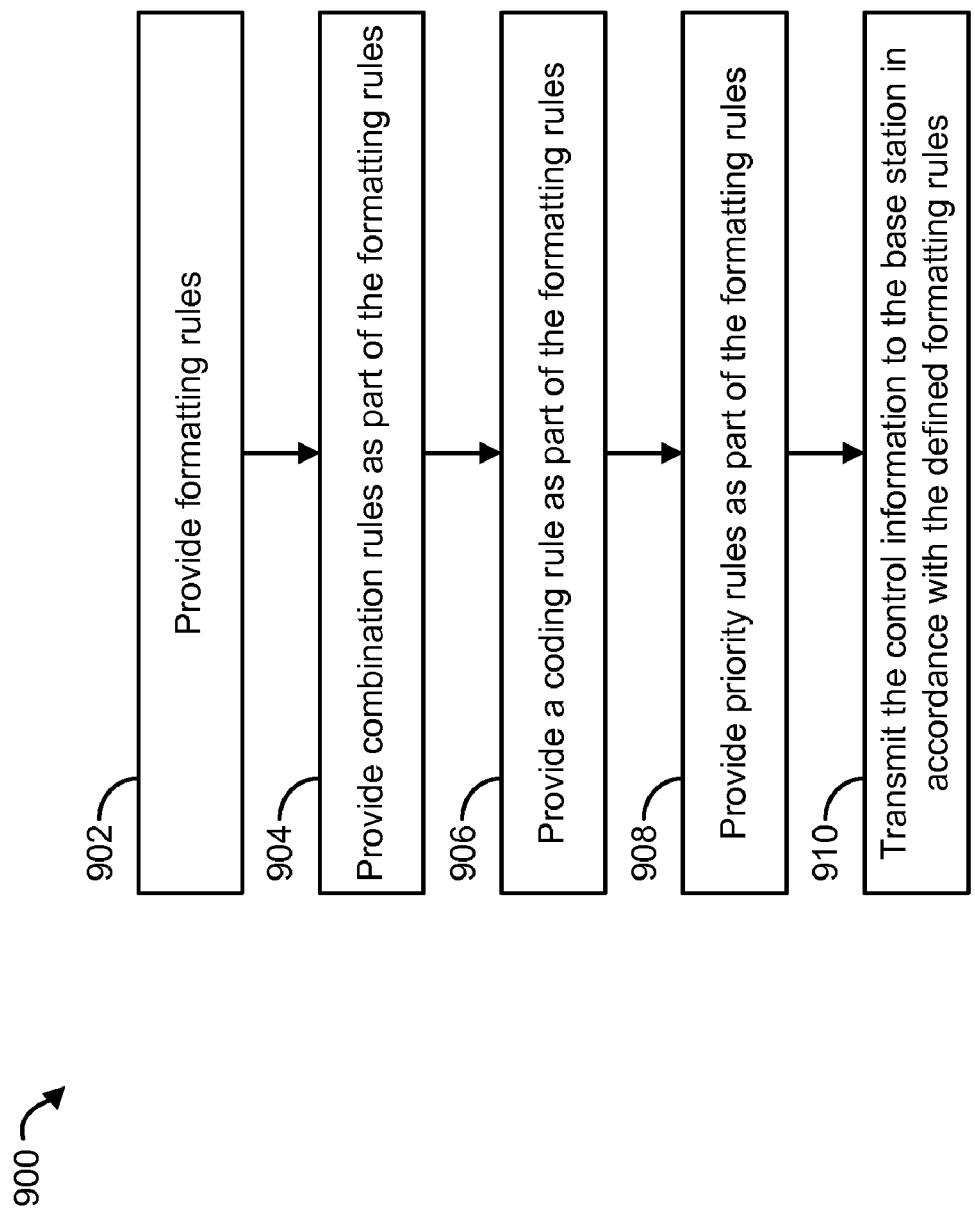
FIG. 9 illustrates a method for transmitting control information.

FIG. 9 illustrates a method 900 for transmitting control information 108. The method 900 may be implemented by a UE 102 in a wireless communication system 100.

The method 900 may include providing 902 formatting rules 120. The formatting rules 120 may define a format for transmission of control information 108 to the base station 104 via a control signaling channel 106. The control information 108 may include the CQI 112 and the ACK 113/NACK 114. If the UE 102 utilizes multiple transmit antennas, then the control information 108 may also include the PMI 116 and the rank information 118.

The method 900 may also include providing 904 combination rules 122 as part of the formatting rules 120. The combination rules 122 may define how the CQI 112, the ACK 113/NACK 114, the PMI 116, and the rank information 118 are combined for transmission on the PUCCH 106.

The method 900 may also include providing 906 a coding rule 134 as part of the formatting rules 120. The coding rule 134 may specify that an embedded coding scheme is used when multiple types of control information 108 are transmitted together. An example of an embedded coding scheme that may be used was discussed above in relation to FIGS. 6-8.

The method 900 also includes providing 908 priority rules 130 as part of the formatting rules 120. The priority rules 130 may define how the CQI 112, the ACK 113/NACK 114, the PMI 116, and the rank information 118 are prioritized for purposes of the coding scheme that is specified by the coding rule 134.

The method 900 also includes transmitting the control information 108 to the base station 104 in accordance with the defined formatting rules 120. Various examples of ways that the UE 102 may transmit control information 108 to the base station 104 in accordance with the defined formatting rules 120 were discussed above in relation to FIGS. 2-5.

Figure 10:
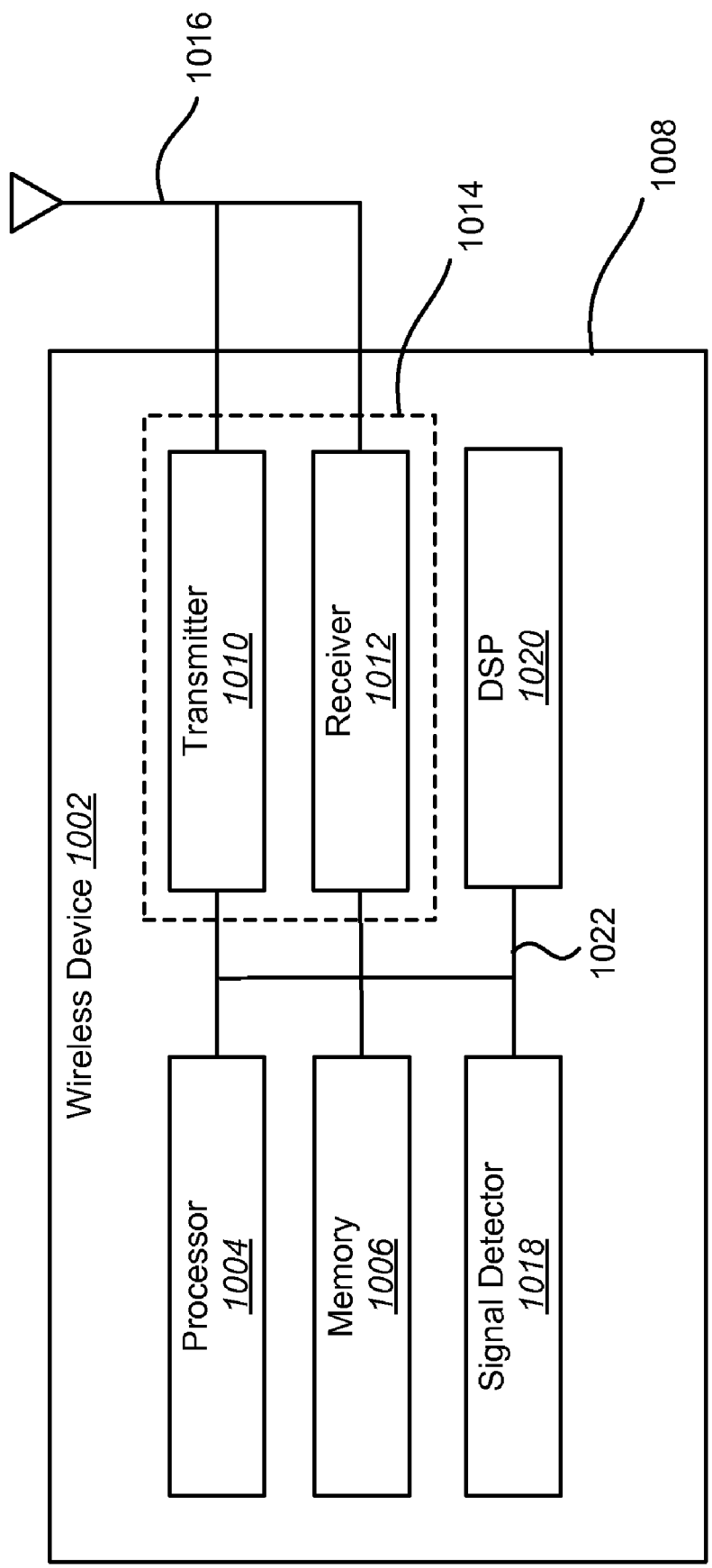
FIG. 10 illustrates various components that may be utilized in a wireless device.

FIG. 10 illustrates various components that may be utilized in a wireless device 1002. The wireless device 1002 is an example of a device that may be configured to implement the various methods described herein. The wireless device 1002 may be a UE 102 or a base station 104.

The wireless device 1002 may include a processor 1004 which controls operation of the wireless device 1002. The processor 1004 may also be referred to as a central processing unit (CPU). Memory 1006, which may include both read-only memory (ROM) and random access memory (RAM), provides instructions and data to the processor 1004. A portion of the memory 1006 may also include non-volatile random access memory (NVRAM). The processor 1004 typically performs logical and arithmetic operations based on program instructions stored within the memory 1006. The instructions in the memory 1006 may be executable to implement the methods described herein.

The wireless device 1002 may also include a housing 1008 that may include a transmitter 1010 and a receiver 1012 to allow transmission and reception of data between the wireless device 1002 and a remote location. The transmitter 1010 and receiver 1012 may be combined into a transceiver 1014. An antenna 1016 may be attached to the housing 1008 and electrically coupled to the transceiver 1014. The wireless device 1002 may also include (not shown) multiple transmitters, multiple receivers, multiple transceivers and/or multiple antenna.

The wireless device 1002 may also include a signal detector 1018 that may be used to detect and quantify the level of signals received by the transceiver 1014. The signal detector 1018 may detect such signals as total energy, pilot energy per pseudonoise (PN) chips, power spectral density, and other signals. The wireless device 1002 may also include a digital signal processor (DSP) 1020 for use in processing signals.

The various components of the wireless device 1002 may be coupled together by a bus system 1022 which may include a power bus, a control signal bus, and a status signal bus in addition to a data bus. However, for the sake of clarity, the various busses are illustrated in FIG. 10 as the bus system 1022.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The various illustrative logical blocks, modules and circuits described herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for transmitting control information, comprising:
   providing formatting rules that define a format for transmission of the control information to a base station via a control signaling channel, wherein the control information comprises a channel quality indicator (CQI), an acknowledgement/non-acknowledgement (ACK/NACK), a pre-coding matrix indicator (PMI), and rank information;
   providing combination rules as part of the formatting rules, wherein the combination rules define how the CQI, the ACK/NACK, the PMI, and the rank information are combined for transmission on the control signaling channel;
   providing a coding rule as part of the formatting rules, wherein the coding rule specifies that a coding scheme is used when multiple types of control information are transmitted together; and
   transmitting the control information to the base station via the control signaling channel in accordance with the defined formatting rules.

2. The method of claim 1, further comprising providing priority rules as part of the formatting rules, wherein the priority rules define how the CQI, the ACK/NACK, the PMI, and the rank information are prioritized for purposes of the coding scheme that is used when multiple types of control information are transmitted together.

3. The method of claim 1, further comprising providing an embedded coding scheme to be used when multiple types of control information are transmitted together.

4. The method of claim 2, wherein the priority rules are based on error protection requirements of the multiple types of control information, and wherein the error protection requirements are defined as ACK/NACK=rank information >PMI=CQI.

5. The method of claim 1, wherein the combination rules comprise a channel quality indicator (CQI) transmission rule which specifies that when the CQI would otherwise be transmitted alone, the CQI is transmitted with the NACK.

6. The method of claim 5, wherein the combination rules comprise reserving 2 bits for ACK/NACK or rank information.

7. The method of claim 1, wherein the combination rules comprise a single sub-frame rule which specifies that if the size of the control information to transmit does not exceed a defined maximum value, the control information is transmitted in a single sub-frame.

8. The method of claim 1, wherein the combination rules comprise a multiple sub-frame rule which specifies that if the size of the control information to transmit exceeds a defined maximum value, the CQI and the ACK/NAK are transmitted in a first sub-frame, and the PMI and the rank information are transmitted in a second sub-frame.

9. The method of claim 1, wherein the combination rules comprise a rule for the base station to schedule the downlink data such that there will be no ACK/NACK triggered when the rank information is scheduled in one subframe.

10. A wireless device that is configured for transmitting control information, comprising:
    a processor;
    memory in electronic communication with the processor;
    formatting rules stored in the memory, wherein the formatting rules define a format for transmission of the control information to a base station via a control signaling channel, wherein the control information comprises a channel quality indicator (CQI), an acknowledgement/non-acknowledgement (ACK/NACK), a pre-coding matrix indicator (PMI), and rank information;
    combination rules among the formatting rules, wherein the combination rules define how the CQI, the ACK/NACK, the PMI, and the rank information are combined for transmission on the control signaling channel;
    an embedded coding rule among the formatting rules, wherein the embedded coding rule specifies that an embedded coding scheme is used when multiple types of control information are transmitted together; and instructions stored in the memory, the instructions being executable to transmit the control information to the base station via the control signaling channel in accordance with the defined formatting rules.

11. The wireless device of claim 10, further comprising priority rules among the formatting rules, wherein the priority rules define how the CQI, the ACK/NACK, the PMI, and the rank information are prioritized for purposes of the embedded coding scheme that is used when multiple types of control information are transmitted together, wherein the priority rules are based on error protection requirements of the multiple types of control information, and wherein the error protection requirements are defined as ACK/NACK=rank information >PMI=CQI.

12. The wireless device of claim 10, wherein the combination rules comprise a channel quality indicator (CQI) transmission rule which specifies that when the CQI would otherwise be transmitted alone, the CQI is transmitted with the NACK.

13. The wireless device of claim 10, wherein the combination rules comprise a single sub-frame rule which specifies that if the size of the control information to transmit does not exceed a defined maximum value, the control information is transmitted in a single sub-frame.

14. The wireless device of claim 10, wherein the combination rules comprise a multiple sub-frame rule which specifies that if the size of the control information to transmit exceeds a defined maximum value, the CQI and the ACK/NAK are transmitted in a first sub-frame, and the PMI and the rank information are transmitted in a second sub-frame.

15. A non-transitory computer-readable medium comprising executable instructions for:
providing formatting rules that define a format for transmission of control information to a base station via a control signaling channel, wherein the control information comprises a channel quality indicator (CQI), an acknowledgement/non-acknowledgement (ACK/NACK), a pre-coding matrix indicator (PMI), and rank information;
providing combination rules as part of the formatting rules, wherein the combination rules define how the CQI, the ACK/NACK, the PMI, and the rank information are combined for transmission on the control signaling channel;
providing an embedded coding rule as part of the formatting rules, wherein the embedded coding rule specifies that an embedded coding scheme is used when multiple types of control information are transmitted together; and
transmitting the control information to the base station via the control signaling channel in accordance with the defined formatting rules.

16. The non-transitory computer-readable medium of claim 15, further comprising executable instructions for providing priority rules as part of the formatting rules, wherein the priority rules define how the CQI, the ACK/NACK, the PMI, and the rank information are prioritized for purposes of the embedded coding scheme that is used when multiple types of control information are transmitted together.

17. The non-transitory computer-readable medium of claim 16, wherein the priority rules are based on error protection requirements of the multiple types of control information, and wherein the error protection requirements are defined as ACK/NACK=rank information >PMI=CQI.

18. The non-transitory computer-readable medium of claim 15, wherein the combination rules comprise a channel quality indicator (CQI) transmission rule which specifies that when the CQI would otherwise be transmitted alone, the CQI is transmitted with the NACK.

19. The non-transitory computer-readable medium of claim 15, wherein the combination rules comprise a single sub-frame rule which specifies that if the size of the control information to transmit does not exceed a defined maximum value, the control information is transmitted in a single sub-frame.

20. The non-transitory computer-readable medium of claim 15, wherein the combination rules comprise a multiple sub-frame rule which specifies that if the size of the control information to transmit exceeds a defined maximum value, the CQI and the ACK/NAK are transmitted in a first sub-frame, and the PMI and the rank information are transmitted in a second sub-frame.

* * * * *